United States Patent
Perry et al.

(10) Patent No.: US 6,714,759 B2
(45) Date of Patent: Mar. 30, 2004

(54) METHOD AND APPARATUS FOR LIMITING ACCESS TO SIGNALS DELIVERED VIA THE INTERNET

(75) Inventors: Jack Perry, Cedar Rapids, IA (US); David J. Cechota, Cedar Rapids, IA (US); Kenneth A. Franken, Iowa City, IA (US); Toufic T. Moubarak, Iowa City, IA (US)

(73) Assignee: Decisionmark Corp., Cedar Rapids, IA (US)

( * ) Notice: Subject to any disclaimer, the term of this patent is extended or adjusted under 35 U.S.C. 154(b) by 256 days.

(21) Appl. No.: 09/803,797

(22) Filed: Mar. 12, 2001

(65) Prior Publication Data

US 2001/0011008 A1 Aug. 2, 2001

Related U.S. Application Data

(63) Continuation of application No. 09/538,215, filed on Mar. 30, 2000, now Pat. No. 6,252,547, which is a continuation-in-part of application No. 09/092,128, filed on Jun. 5, 1998, now Pat. No. 6,147,642.

(51) Int. Cl.⁷ .................................................. H04B 1/18
(52) U.S. Cl. ........................................ 455/3.02; 725/49
(58) Field of Search ................................ 455/3.02, 303, 455/3.01, 427, 428, 185.1, 186.1, 184.1; 725/48, 49, 25; 370/316, 323

(56) References Cited

U.S. PATENT DOCUMENTS

| | | | |
|---|---|---|---|
| 5,535,430 A | | 7/1996 | Aoki et al. |
| 5,689,245 A | * | 11/1997 | Noreen et al. ......... 340/825.49 |
| 5,805,230 A | * | 9/1998 | Staron ........................ 348/460 |
| 5,950,127 A | | 9/1999 | Nitta et al. |
| 5,956,629 A | * | 9/1999 | Morrison .................. 455/166.2 |
| 6,009,116 A | * | 12/1999 | Bednarek et al. ............ 375/130 |
| 6,108,365 A | * | 8/2000 | Rubin et al. ................. 375/130 |
| 6,147,642 A | | 11/2000 | Perry et al. |
| 6,181,921 B1 | * | 1/2001 | Konisi et al. ............. 455/186.2 |
| 6,208,834 B1 | * | 3/2001 | Tawil et al. ................ 455/3.02 |

FOREIGN PATENT DOCUMENTS

JP    06-268934    9/1994

* cited by examiner

*Primary Examiner*—Nay Maung
*Assistant Examiner*—Nick Corsaro
(74) *Attorney, Agent, or Firm*—Simmons, Perrine, Albright & Ellwood PLC

(57) ABSTRACT

An apparatus for controlling the reception of electronic digital signals, which could include internet signals as a function of the location of a receiver for receiving the internet signals and further as a function of the signal strength of a terrestrially broadcast television signal at the location of the internet receiver is disclosed.

6 Claims, 2 Drawing Sheets

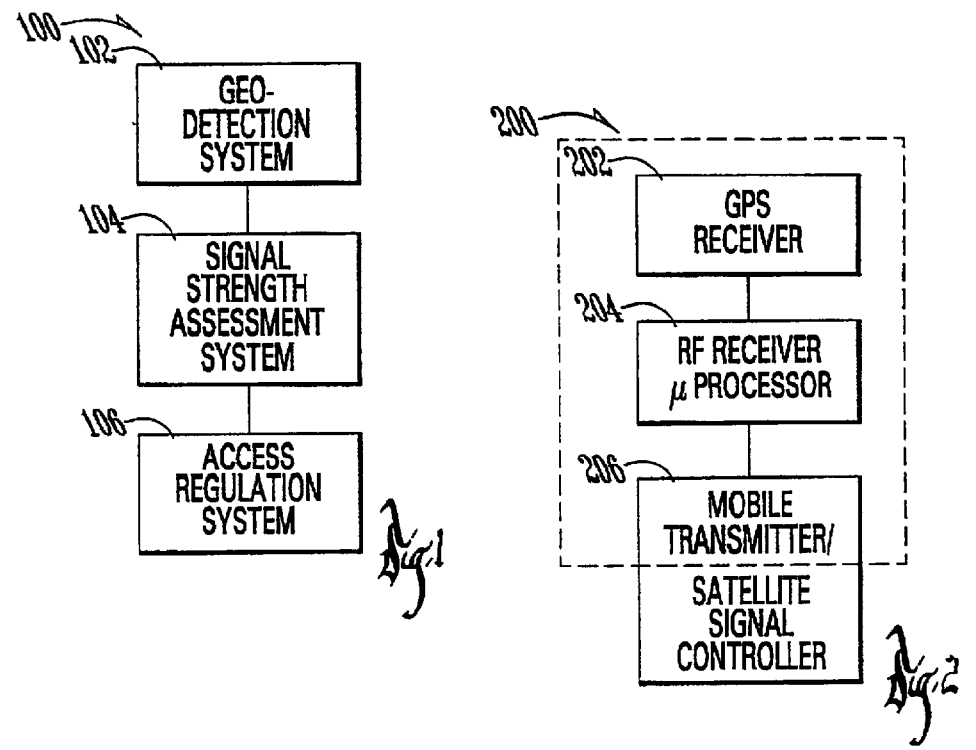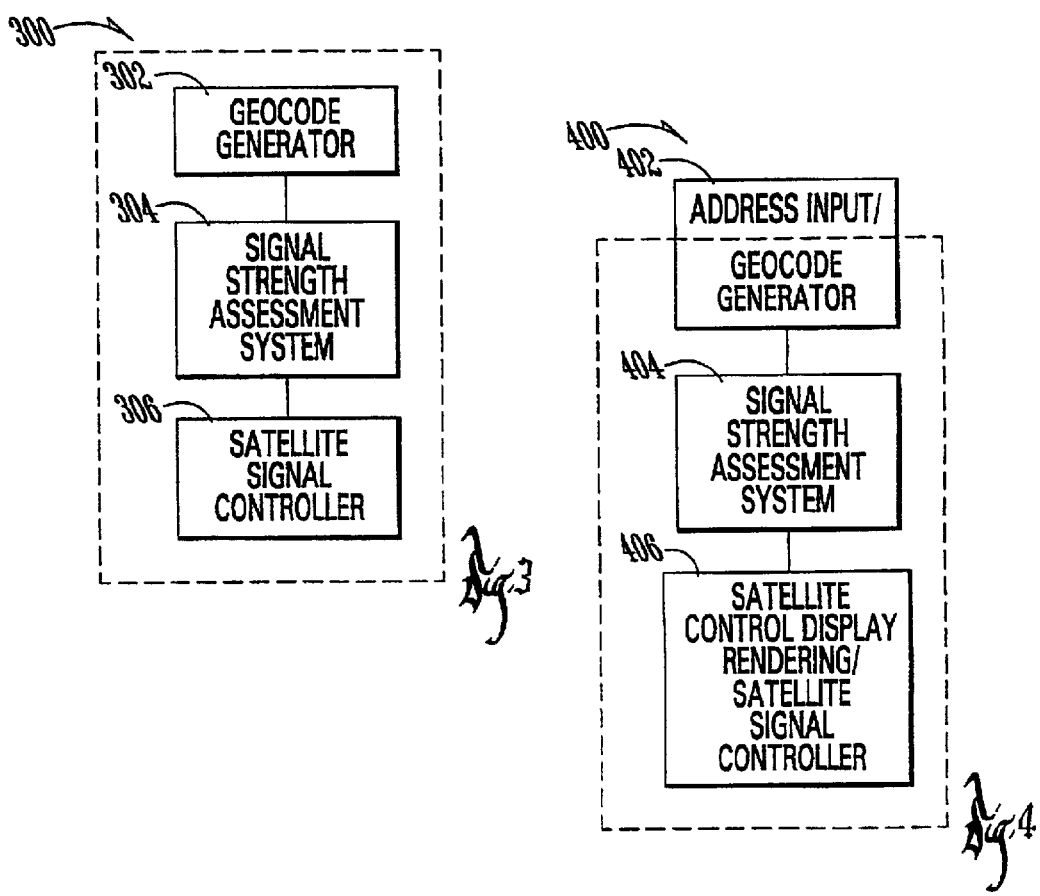

METHOD AND APPARATUS FOR LIMITING ACCESS TO SIGNALS DELIVERED VIA THE INTERNET

CROSS REFERENCE TO RELATED APPLICATIONS

This application is a continuation of and relates to co-pending application entitled "METHOD AND APPARATUS FOR LIMITING ACCESS TO SIGNALS DELIVERED VIA THE INTERNET, having Ser. No. 09/538,215 and filed on Mar. 30, 2000 now U.S. Pat. No. 6,252,547, which is a CIP of Ser. No. 09/092,128 for "METHOD AND APPARATUS FOR LIMITING ACCESS TO SATELLITE COMMUNICATION SIGNALS" filed on Jun. 5, 1998, now issued as U.S. Pat. No. 6,147,642.

FIELD OF THE INVENTION

The present invention relates to satellite communication, and more particularly relates to regulation of access to satellite communication signals via electronic means responsive to geographic reference signals.

BACKGROUND OF THE INVENTION

In the past, network television signals were only receivable by viewers receiving signals broadcast from terrestrial transmitters at distributed network affiliate stations. As a result, in years past, many remote and rural areas of the U.S. had either no, or very limited, access to network television service. With the advent of satellite communications, many of these remote viewers are now able to receive network programming; however, many of the networks would like to restrict the availability of these signals to only those customers in locations which are unable to receive signals broadcast from network affiliate stations. The difficulty in meeting the networks' desires is increased by the fact that today, more and more homes and business are located in remote areas and further, by the use of television satellite receivers on recreational vehicles which are able to move in and out of remote areas.

Consequently, there exists a need for improved methods and apparatuses for determining and regulating the availability of access to satellite communication signals.

SUMMARY OF THE INVENTION

It is an object of the present invention to provide enhanced abilities to quickly and easily regulate access to satellite communication signals.

It is a feature of the present invention to include an apparatus for determining a geographic reference point for a particular satellite customer.

It is an advantage of the present invention to achieve a more accurate assessment of the quality of terrestrial broadcast signals at a particular location.

It is another object of the present invention to provide a real time determination of access to satellite communication signals.

It is another feature of the present invention to include a geographic reference point for a particular location.

It is another feature of the present invention to include a GPS receiver for generating geographic reference points for a mobile satellite receiver.

It is another object of the present invention to provide low cost determination of the availability of access to satellite communication signals.

It is yet another feature of the present invention to include a distributed processing system.

It is another advantage of the present invention to reduce cost by using existing computing resources and a central location for application specific resources.

It is another object of the present invention to provide wide accessibility to resources for determining access to satellite communication signals.

It is another feature of the invention to utilize computer networks, such as the Internet, for interconnecting several components of a distributed system.

The present invention is a method and apparatus for determining and regulating the access to satellite communication signals based upon a determination of a geographic position for a potential satellite signal receiver, which is designed to satisfy the aforementioned needs, provide the previously stated objects, include the above-listed features and achieve the already articulated advantages. In the present invention, the time required, the difficulty and the expense associated with accurately regulating access to satellite communication signals have been reduced.

Accordingly, the present invention is a method and apparatus for determining and regulating access to satellite communication signals by reference to a geographic determination of the location of a potential satellite receiver and a generation of a signal representative of a signal strength of terrestrially broadcast television signals at a particular location.

BRIEF DESCRIPTION OF THE DRAWINGS

The invention may be more fully understood by reading the following description of the preferred embodiments of the invention, in conjunction with the appended drawings wherein:

FIG. 1 is a block diagram of the major functional components of a system of the present invention.

FIG. 2 is a block diagram of the major functional components of a system of the present invention in which the dashed lines encircle portions of the system coupled to the satellite receiver.

FIG. 3 is a block diagram of the major functional components of a system of the present invention in which the dashed lines encircle portions of the system located at a satellite signal control station.

FIG. 4 is a block diagram of the major functional components of a system of the present invention in which the dashed lines encircle portions of the system located at a satellite signal control station.

DETAILED DESCRIPTION OF THE DRAWINGS

Figure 5:
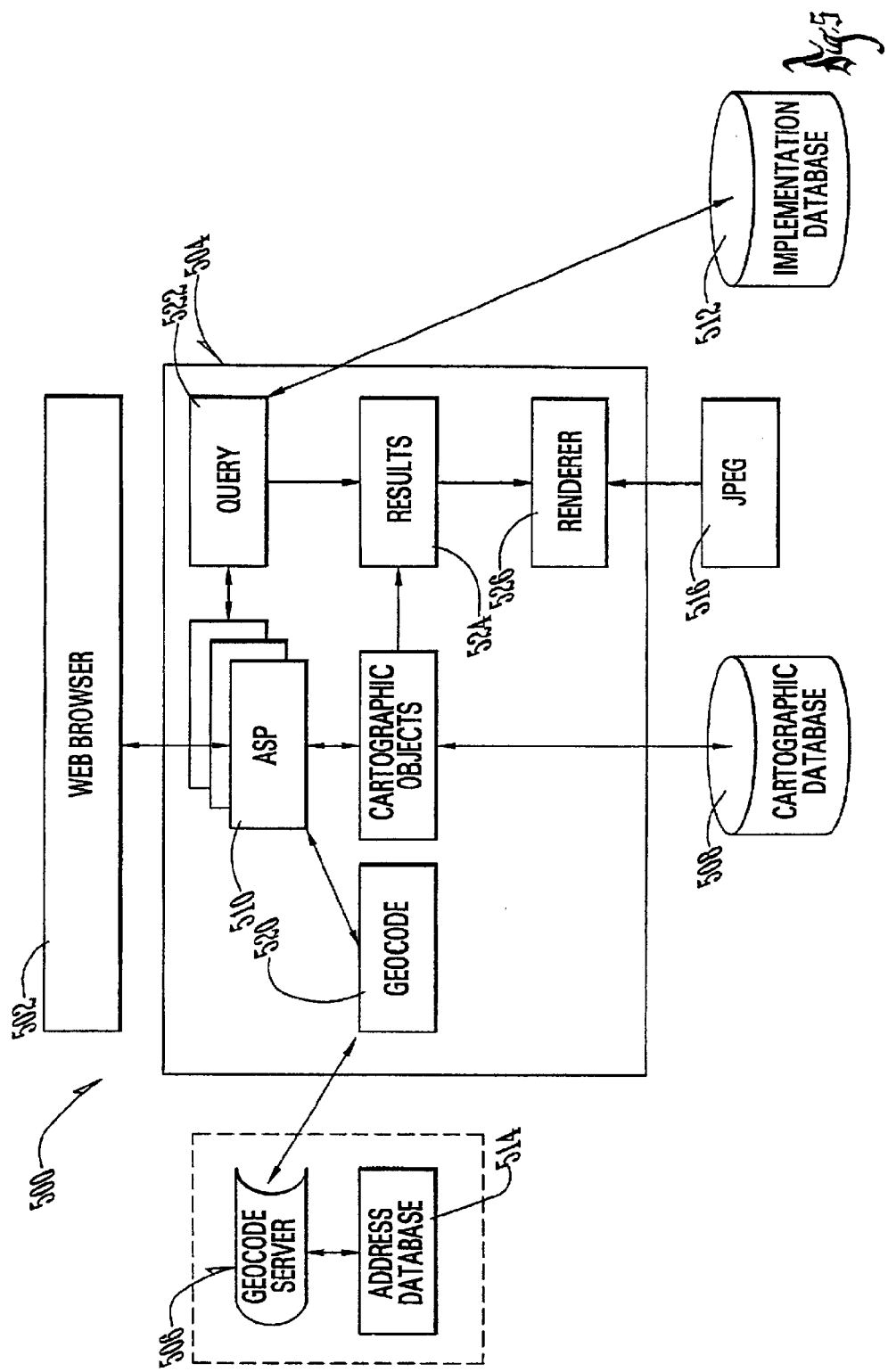
FIG. 5 is a block diagram of the major functional components of a system of the present invention in which the dashed lines encircle portions of the system implemented on a single server and the dotted and dashed lines represent portions of the system implemented on a separate server.

Now referring to the drawings, wherein like numerals refer to like matter throughout, and more specifically to FIG. 1, there is shown a satellite communication regulating system of the present invention generally designated 100, having a geodetection system 102, a signal strength assessment system 104 and an access regulating system 106.

In various embodiments of the present invention, the functions of systems 102, 104 and 106 have varying levels of physical distribution. For example, in systems for real time regulation of mobile satellite receivers (see FIG. 2 and accompanying text), all systems may be co-located with the mobile satellite receiver. The expense of this approach may be unnecessary for other less mobile needs. For example, in another potential embodiment, the majority of the system can be performed by one personal computer with specially designed software. In yet another embodiment, use can be made of existing software, such as web browsers, and portions of the system's functions can be distributed to end users operating personal computers not dedicated solely to the task of regulating access to a satellite communication system (see FIG. 3 and accompanying text), while the process can be further distributed to various clients and a central server (see FIG. 4 and accompanying text).

Now referring to FIG. 2, there is shown an apparatus of the present invention generally designated 200, having a GPS receiver 202, which essentially performs the function of block 102 of FIG. 1. The dotted line in FIG. 2 encircles the components of the present invention which are co-located with a mobile satellite receiver. The GPS receiver determines the location of the mobile satellite receiver and generates a geocode or lat-lon reference signal corresponding to the current location of the mobile satellite receiver. This signal is provided to RF receiver/microprocessor 204. The microprocessor is used to tune the frequencies of local network television affiliates in the vicinity of the location determined by the GPS receiver. The RF receiver determines the signal strength of the received signals, and the microprocessor compares the signal strengths to a predetermined threshold. Based upon the results of the comparison, a determination of access to network satellite signals is made. Coupled to RF receiver/microprocessor 204 is mobile transmitter/satellite signal controller 206. Block 206 includes a mobile transmitter which transmits the results of the comparison of the signal strengths to a predetermined threshold to a remote location in which the satellite signal controller is located. The satellite signal controller is well known in the art of generation and control of satellite signals and is used to permit and/or restrict access to network television signals broadcast from a satellite by including an ID code which enables remote satellite receivers to fully utilize the satellite signals. These satellite signal controllers are currently in use and well known in the art.

Now referring to FIG. 3, there is shown an embodiment of the present invention generally designated 300, having a geocode generator 302, a signal strength assessment system 304 coupled thereto, and a satellite signal controller 306. The entire blocks 302, 304 and 306 are shown to be enclosed within the dashed line of FIG. 3, thereby representing that all of these functional blocks are co-located and are typically disposed or coupled to the well-known apparatus for uplinking information to communication satellites. The entire system 300 could be performed on a single computer, such as a personal computer. The geocode generator would include an input/output capability in which an operator could input an address of a residence or business which utilizes a satellite receiver. The operator could enter the address, and known geocode generators could generate latitude and longitude signals in response to the input address. This latitude/longitude determination would be used as an input in the signal strength assessment system in which local network television affiliates are identified in the vicinity of the lat-lon reference generated by the geocode generator, and a calculation of the signal strength of each of the local network affiliates can be calculated at each position determined by the geocode generator. If the signal strength falls below a predetermined threshold, then an access enabling determination is forwarded from Block 304 to Blocks 306. Block 306 would be the satellite's signal controller, which would then generate an appropriate access code for transmission to the remote satellite receiver, thereby enabling reception of the network transmission. The benefits of the system 300 are that it can provide the ability to generate and regulate access to network transmissions in a cost-effective manner. The obvious downside of system 300 in comparison to system 200 is that it is located at a fixed site, and it does not allow for real time adjustment of the access to the network signals. Additionally, system 300 is limited to allowing access of input at one location.

Now referring to FIG. 4, there is shown a system of the present invention, generally designated 400, having an address input/geocode generation block 402 coupled to a signal strength assessment system 404, which is coupled to a satellite controlled display rendering system/satellite signal controller 406. The system 400 allows for a more distributed approach than does system 300, and the matter encircled by the dashed line in FIG. 4 represents the portions of the system which could be co-located. The address input component of Block 402 could be distributed to various users dispersed geographically, thereby allowing for increased use and access to the system 400. The address input function of Block 402 could be performed by common hardware and software in an effort to reduce the overall cost of implementing system 400. For example, the address input component of Block 402 could be performed by numerous personal computers using well-known web browsers. The information could be input at various locations and transmitted over the Internet to a central location where the geocode generation component of Block 402 could transform the street address to a latitude and longitude. This latitude and longitude could then be utilized by signal strength assessment system 404 to make a determination of the signal strength of various local network television affiliates in the vicinity of the address input by the operator.

Now referring to FIG. 5, there is shown a system of the present invention generally designated 500, which provides for widely distributed processing capability, which includes at least one Web browser 502 disposed at a first location and on a first computer. This computer may be a typical IBM compatible computer operating on a Windows environment or any other computer capable of operating a Web browser or subsets of a Web browser. The Web browser 502 is coupled via a computer network to a satellite signal control server 504 located at a second location which is designated by the intermittent line and preferably is located on a single server and operates on industry standard Web server software, such as Microsoft Internet Information Server (HS) Version 3.0 or later. Server 504 hosts several Active Server Pages (ASPS) which contains scripts of actions to perform and programmatic steps to generate Hyper Text Markup Language (HTML) to be provided back to Web browser 502. Server 504 provides a novel mechanism for producing complex interaction without requiring sophisticated browser technology such as client side Java Applets or dynamic HTML (DHTML) on Web browser 502. Active Server Pages 510 may, but need not contain embedded therein scripts such as Visual Basic script (VB script) or Microsoft's dialect of JavaScript. The ASP 510 may be able to use any standard component that runs with an NT server environment, such as Microsoft-defined interfacing standard Component Object Model (COM). This enables designers to very early tailor the present invention to meet particular user requirements. All that a designer need do is customize the ASP 510 without the need for other changes to result in a customized interface with browser 502.

Coupled to server 504 is geocode server 506, which may be a separate process providing geocoding services. This geocode server may be any commercially available geocoder, such as geocoders provided by QMS, Group I and Match Ware, all of which are known in the art, or in other implementation. The function of geocode server 506 could be provided by a GPS receiver. In a preferred embodiment, the geocode server 506 might be configured such that a "wrapping" or geocoding interface is interposed between the commercially available geocoders (QMS, Group 1, Match Ware, etc.) or a GPS receiver, so as to provide a uniform interface with the remainder of system 500. However, it is believed that in some instances, it may be preferable to operate servers 504 and 506 on independent computers. Server 504 is shown coupled to Cartographic database 508 and Implementation database 512. These may be standard Structured Query Language (SQL) databases which contain cartographic data and data specific to a particular implementation of the present invention. In one embodiment of the present invention, the implementation database 512 would contain information about specific television stations, including their DMA, call sign, network affiliation, and signal area map. It should be understood that in other applications, the databases would not contain television signal related information and would be tailored to include other information which is dependent upon and associated with certain predetermined locations. The cartographic database 508 may contain background cartography, such as state and county boundaries, interstate highways, and coastal water. These databases are preferably SQL databases that the Web server 504 accesses using standard Open Database Connectivity (ODBC) drivers. The present invention need not specify any particular database or database server platform, a candidate database need only provide an ODBC driver and be capable of storing SQL Binary Logic Objects (BLOBs). The preferred embodiment of the present invention uses Microsoft SQL servers running on an independent machine from the IIS server 504.

All databases 508, 512, and address database 514 of geocode server 506 may contain cartographic data which conforms to the Puckett database format. This format provides for standard encoding of cartographic shape data, and for storing that data directly within a standard SQL database.

Web server 504 may generate a geographical map 516 upon a request from a client operating Web browser 502. The map representation 516 may be in any industry standard graphics format, such as JPEG, PNG, GIF, or any suitable format.

The present invention may be more fully understood by reviewing its operation. In operation, the present invention performs as follows:

A user inputs a URL for a particular ASP of the server 504 into Web browser 502. Server 504 contains the active server page and generates and delivers a page with HTML to Web browser 502. The user enters a street address into Web browser 502 and transmits the same to server 504 which, with the aid of geocode function 520, identifies the need for geocoding the address and communicates the street address to geocode server 506, which accesses address database 514 and develops a latitude and longitude reference for the street address and provides the same back to geocode function 520. Query function 522 is called by ASP 510 to request a list of stations which match the given latitude and longitude coordinates in a particular DMA. The query object 522 makes a database query of implementation database 512 and calls the point-in-polygon function provided by the Puckett cartographic object library or other mechanism, such as the signal strength assessor. The Query object 522 then generates a results object 524 to contain information about the identified relevant television stations.

In a second phase, the Active Server Page 510 goes through the information contained in the results object 524 and then emits an HTML table page that describes the relevant stations. This table may contain HTML code for hyperlinks that a client or user operating Web browser 502 may select to view a map or other related information.

In a third phase, the user of browser 502 selects a hyperlink for a map which is transmitted back to ASP 510 which submits a request to the results object 524 to emit a map in a browser supported graphics format, such as PNG or JPEG map 516. The results object 524 first creates a multi-layer map using the Puckett cartographic object library. The results object next uses the standard Puckett map rendering component to draw the map. The renderer 526 uses the standard cartographic object library as it draws.

Consequently, a user of Web browser 502 is able to determine a signal strength characteristic of a particular television station at a known street address through the use of the invention 500. In general, the user of Web browser 502 may be given information relating to the signal strength of a particular terrestrially broadcast television station at a particular location and whether or not that signal strength exceeds a predetermined threshold characteristic. The user of Web browser 502 may desire additional information relating to the signal strength and may request via Web browser 502 that a map in a format that is supported by the browser be generated. This map may show the geographic area in which the signal strength is believed to be in excess of a predetermined threshold. The user of Web browser 502 then may directly or indirectly manipulate a combination of a satellite receiver and a satellite transmitter in response to the signal strength signal so as to pen-nit or deny access to a predetermined satellite signal based upon a comparison of a signal strength of the terrestrially broadcast television signal with a predetermined threshold. A designer may choose to use well-known devices, such as Puckett point-in-polygon testers and Longley-Rice signal strength calculators.

Throughout this description, references are made to satellite receivers. It is intended that the present invention could also include internet receivers, which term shall include any appliance for receiving and either visually displaying information or producing an audible sound, as a result of receiving signals via the internet. This could include, but need not be limited to, personal computers, e-machines, internet appliances, etc. Throughout this description, references are made to television signals and television communication. It should be understood that these terms should include signals relating to radio, as well as those relating to television. Throughout this description, references are made to satellite signal controller, satellite control display rendering, and access regulation system. It should be understood that these terms could also include internet signal controllers, internet control display rendering, and an internet access regulation system, which terms should be understood to include any means to regulate access to signals or sites on the internet, including, but not limited to, passwords, cookies, electronic signatures, electronic keys, encryption, and any other access regulating device used with respect to internet communications. The details of any particular access restricting system, device, or scheme are not given here because the present invention is intended to include any type of access restricting system in the prior art, as well as future modifications of or substitute for such access restricting systems, devices, or schemes.

It is thought that the method and apparatus of the present invention will be understood from the foregoing description and that it will be understood from the foregoing description that it will be apparent that various changes may be made in the form, construction, steps and arrangement of the parts and steps thereof, without departing from the spirit and scope of the invention or sacrificing all of their material advantages. The form herein described is merely a preferred or exemplary embodiment thereof.

We claim:

1. A method of regulating access to electronic digital communication signals comprising:

determining geographic reference information for a particular location on the surface of the earth;

wherein said geographic reference information is a unique identifier of a worldwide geographic reference scheme which associates a unique identifier with every location on earth;

using said geographic reference information in calculating signal strength signal representative of a signal strength of a predetermined terrestrially broadcast signal at said particular location;

inhibiting use of a predetermined electronic digital signal, which is not a terrestrially broadcast signal, in response to said signal strength signal, when said signal strength signal exceeds a predetermined threshold; and wherein said step of using and said step of inhibiting each do not include a step of receiving said predetermined terrestrially broadcast signal at said particular location.

2. A method of regulating access to electronic digital communication signals comprising:

determining geographic reference information for a particular location on the surface of the earth;

wherein said geographic reference information is a unique identifier of a worldwide geographic reference scheme which associates a unique identifier with every location on earth;

using said geographic reference information in calculating signal strength signal representative of a signal strength of a predetermined terrestrially broadcast signal at said particular location;

inhibiting use of a predetermined electronic digital signal, which is not the predetermined terrestrially broadcast signal, in response to said signal strength signal, when said signal strength signal exceeds a predetermined threshold; and wherein said predetermined electronic digital signal is a signal transmitted over an internet connection.

3. A method of regulating access to electronic digital communication signals comprising:

determining geographic reference information for a particular location on the surface of the earth;

wherein said geographic reference information is a unique identifier of a worldwide geographic reference scheme which associates a unique identifier with every location on earth;

using said geographic reference information in calculating signal strength, signal representative of a signal strength of a predetermined terrestrially broadcast signal at said particular location;

inhibiting use of a predetermined electronic digital signal, which is not the predetermined terrestrially broadcast signal, in response to said signal strength signal, when said signal strength signal exceeds a predetermined threshold; and wherein said predetermined electronic digital signal is a signal transmitted via satellite.

4. A method of regulating access to electronic digital communication signals comprising:

determining geographic reference information for a particular location on the surface of the earth;

wherein said geographic reference information is a unique identifier of a worldwide geographic reference scheme which associates a unique identifier with every location on earth;

using said geographic reference information in calculating signal strength signal representative of a signal strength of a predetermined terrestrially broadcast signal at said particular location;

inhibiting use of a predetermined electronic digital signal, which is not the predetermined terrestrially broadcast signal, in response to said signal strength signal, when said signal strength signal exceeds a predetermined threshold;

wherein said predetermined electronic digital signal is a signal transmitted via satellite; and wherein said inhibiting use of a predetermined electronic digital signal utilizes a display screen to display access information relating to an access characteristic.

5. A method of regulating access to electronic digital communication signals comprising:

determining latitude and longitude reference coordinates for a particular location on the earth;

utilizing a Longley-Rice signal strength calculator to determine a geographic reception area for a predetermined terrestrially broadcast signal having a signal strength above a predetermined threshold;

using a Puckett point-in-polygon tester to make a comparison of said coordinates with points inside said geographic reception area;

inhibiting access to a predetermined electronic digital signal, which is not the predetermined terrestrially broadcast signal, in response to said comparison, when said coordinates are located inside said geographic reception area, and, said predetermined electronic digital signal is a signal transmitted over an internet connection.

6. A method of regulating access to electronic digital communication signals comprising:

determining a latitude and a longitude for a particular location on the earth;

using the latitude and the longitude for generating signal strength signals representative of a signal strength of a predetermined terrestrially broadcast signal at said particular location;

inhibiting access to a predetermined electronic digital signal, which is not a terrestrially broadcast signal, in response to said signal strength signal, when said signal strength signal exceeds a predetermined threshold; and wherein said step of using and said step of inhibiting each do not include a step of receiving said predetermined terrestrially broadcast signal at said particular location.

* * * * *